(12) United States Patent
Terunuma et al.

(10) Patent No.: US 6,496,903 B1
(45) Date of Patent: Dec. 17, 2002

(54) CACHE MEMORY DEVICE

(75) Inventors: Takashi Terunuma, Kawasaki (JP); Shinya Kato, Kawasaki (JP); Takumi Nonaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 110 days.

(21) Appl. No.: 09/714,291

(22) Filed: Nov. 17, 2000

(30) Foreign Application Priority Data

Jan. 28, 2000 (JP) ........................................ 2000-020914

(51) Int. Cl.[7] ................................................ G06F 12/00
(52) U.S. Cl. ........................................ 711/128; 711/122
(58) Field of Search ................................ 711/128, 122, 711/146

(56) References Cited

U.S. PATENT DOCUMENTS 5,210,845 A * 5/1993 Crawford et al. ............ 711/128
5,339,399 A * 8/1994 Lee et al. .................... 711/146
5,724,547 A * 3/1998 Iyengar et al. ............... 711/128
6,321,297 B1 * 11/2001 Shamanna et al. ........... 711/122

FOREIGN PATENT DOCUMENTS

JP              60-59451 A          4/1985

* cited by examiner

Primary Examiner—Do Hyun Yoo
Assistant Examiner—Nasser Moazzami
(74) Attorney, Agent, or Firm—Staas & Halsey LLP (57) ABSTRACT

A cache memory device by which a processing speed can be elevated and which comprises a primary cache memory containing two primary ways of WAY0 and WAY1 each retaining a bit LRU0 and a bit LRU1 taking either a value 0 or 1 together with data and an address, a primary old way determining circuit for determining, on the basis of patterns of the bit LRU0 and the bit LRU1, which is an old way retaining data which has not been accessed for the longest period of time in the primary ways WAY0 and WAY1, and a primary cache control circuit inverting only the bits (the bit LRU0 or the bit LRU1) retained in the old way which has been accessed.

6 Claims, 8 Drawing Sheets

| LRU0 | LRU1 | $WAY_{OLD1}$ |
|------|------|--------------|
| 0    | 0    | 0            |
| 0    | 1    | 1            |
| 1    | 0    | 1            |
| 1    | 1    | 0            |

| INCL0 | INCL1 | LRU0' | LRU1' | WAY$_{OLD2}$ |
|---|---|---|---|---|
| 0 | 0 | 0 | 0 | 0 |
| 0 | 0 | 0 | 1 | 1 |
| 0 | 0 | 1 | 0 | 1 |
| 0 | 0 | 1 | 1 | 0 |
| 1 | 1 | 0 | 0 | 0 |
| 1 | 1 | 0 | 1 | 1 |
| 1 | 1 | 1 | 0 | 1 |
| 1 | 1 | 1 | 1 | 0 |
| 0 | 1 | X | X | 0 |
| 1 | 0 | X | X | 1 |

FIG.8

CACHE MEMORY DEVICE

FIELD OF THE INVENTION

The present invention relates to a cash memory device containing a cash memory of 2 way set associative method, and more particularly to a cash memory device having a function for replacing ways by means of an LRU (Least Recently Used) algorithm and the like.

BACKGROUND OF THE INVENTION

With progress of computers, more speeding up in access is demanded. In response to such demand, a system provided with a cash memory device composed of cash memories thereby to intend speeding up in accessing of data increases. However, there is still a need for a cash memory device having a faster processing speed in these days where processing speed of computer increases dramatically.

In computer system, a cash memory and a cash memory device provided with a cash control section capable of high-speed reading/writing has been heretofore been used for eliminating differences in speed between a CPU and a main memory. In such a cash memory device, data transmission between the CPU and a cash memory (main memory) is carried out in line unit.

As a method for allowing data on a main memory to correspond to a line in a cash memory, there is a set associative method wherein the main memory and the cash memory are divided into a plurality of sets (a set of lines: called by the name of "way"), and a certain data on the main memory shall be disposed on only a line contained in each way which has been previously determined. For example, if there are two ways, it is called by the name of "2 way set associative method".

Such cash memory holds a part of the data stored in the main memory, it is, for instance, memory of the above-mentioned 2 way set associative method. The cash memory is composed of tag RAM (Random Access Memory) retaining an address representing storage positions of data and data RAM retaining the above described data.

In each of two ways in tag RAM, a bit LRU which is used in determination of an old way is maintained in accordance with LRU algorithm. In LRU algorithm, a way which has not been referred to for the longest period of time in two ways is the one corresponding to the above described old way. Bits LRU retained in two ways, respectively, are used for determining a fact which way is an old way in the two ways.

Furthermore, in either a case where a cash hit which means that data to be read exists in cash memory arises, or a case where replacement which means that the data and addresses in cash memory should be updated arises, a cash control section accesses two ways, respectively, to update an old way, whereby bits LRU retained in the respective ways are updated. As a result, the old way shifts from an either way where cash hit (replacement) arose to the other way.

Meanwhile, as mentioned above, when bits LRU are updated as a result of arising of cash hit or replacement in a conventional cash memory device, a cash control section must access to two ways, respectively. More specifically, in case of updating bits LRU, two times of access are required in such that first, the cash control section accesses to either of two ways, and then, it accesses to the other way. Accordingly, there has been such a problem that a processing speed becomes slow by an amount of period of time required for accessing operations of two times in a conventional cash memory device.

SUMMARY OF THE INVENTION

It is an object of the present invention to provide a cash memory device by which a processing speed can be elevated.

In order to achieve the above described object, the invention described in a first aspect of the invention relates to a cash memory device utilizing an algorithm wherein replacement is conducted with respect to an old way retaining data which has not been accessed for the longest period of time, characterized in that the cash memory device is composed of a cash memory (corresponding to a primary cash memory 11 in the first embodiment which will be mentioned hereinafter) containing two ways each retaining bits taking a value 0 or 1 together with data and an address, respectively; an old way determining means (corresponding to a primary old way determining circuit 13 in the first embodiment which will be mentioned hereinafter) for determining which way of the two ways is the above described old way on the basis of patterns of two bits retained in the above described two ways; and a control means (corresponding to a primary cash control circuit 14 in the first embodiment which will be mentioned hereinafter) for inverting only the bits retained in a way which has been accessed in the two ways in the case when the present way which has been accessed is the above described old way, while maintaining values of the bits retained in the present way in the case when the way which has been accessed is not the above described old way.

According to the present invention, in the old way determining means, an old way is determined from two ways on the basis of patterns of two bits in 2-bit composition (combinations of "0" and "1"). Thus, when either of two ways is accessed, the control means determines whether or not the way which has been accessed is an old way on the basis of a result of determination by the old way determining means, and when the accessed way is an old way, only the bits retained in this accessed way are inverted. Accordingly, bits in the other way which has not been accessed are not inverted. Namely, in this case, the control means accesses one time to only either way of these two ways.

On one hand, when the way which has been accessed is not the above described old way, the control means maintains values of bits retained in this way. Namely, in this case, the control means accesses to neither of these two ways nor the other.

As described above, according to the invention as described in the first aspect of the invention, it is arranged in such that when an old way is accessed, only the bits retained in the old way in two bits which have been retained respectively in two ways are inverted, so that it is sufficient for only one time access in case of updating bits, whereby a processing speed can be elevated in comparison with two times access in the prior art.

Furthermore, a second aspect of the invention relates to the cash memory device as described in the first aspect of the invention, characterized in that when a way which was cash-hit or replaced is the above described old way, the aforesaid control means inverts only the bits retained in the aforesaid way which was cash-hit or replaced, while when the aforesaid way which was cash-hit or replaced is not the above described old way, values of the bits retained in the present way are maintained.

According to the present invention, an old way is determined from two ways on the basis of patterns of two bits in 2-bit composition (combinations of "0" and "1") in the old way determining means. Then, when either of two ways is cash-hit or replaced, the control means determines whether or not the way which was cash-hit or replaced is an old way on the basis of a result of determination by the old way determining means, and when the aforesaid way is an old way, only the bits retained in the aforesaid way are inverted. Accordingly, bits retained in the other way are not inverted. Namely, in this case, the control means accesses to only either of two ways one time.

On the other hand, when the way which was accessed is not the aforesaid old way, the control means maintains values of bits retained in the way which was accessed. Namely, in this case, the control means does not accesses to both the ways of these two ways.

As described above, according to the second aspect of the invention, it is arranged in such that when an old way is cash-hit or replaced, only the bits retained in the old way in two bits which have been retained respectively in two ways are inverted. Accordingly, it is sufficient for only one time access in case of updating bits, whereby a processing speed can be elevated in comparison with two times access in the prior art.

Moreover, a third aspect of the invention relates to a cash memory device utilizing an algorithm wherein replacement is conducted with respect to an old way retaining data which has not been accessed for the longest period of time, characterized in that the cash memory device is composed of a cash memory (corresponding to a primary cash memory 11 in the first embodiment which will be mentioned hereinafter) containing two ways each retaining bits taking a value 0 or 1 together with data and an address, respectively; an old way determining means (corresponding to a primary old way determining circuit 13 in the first embodiment which will be mentioned hereinafter) for determining which way of the above described two ways is the above described old way on the basis of patterns of two bits retained in the aforesaid two ways; and a control means (corresponding to a primary cash control 14 in the first embodiment which will be mentioned hereinafter) for inverting only the bits retained in the aforesaid way in the case when the above described replacement has been conducted.

According to the present invention, an old way is determined from two ways based on patterns of two bits in 2-bit composition (combinations of "0" and "1") in the old way determining means. When replacement is made with respect to an old way, only the bits retained in the old way are inverted. Therefore, bits in the other way are not inverted. Namely, in this case, the control means accesses to only either way of two ways one time.

As described above, according to the third aspect of the invention, it is arranged in such that when an old way is replaced, only the bits retained in the old way are inverted, so that it is sufficient for only one time access in case of updating bits, whereby a processing speed can be elevated in comparison with two times access in the prior art.

Furthermore, a forth aspect of the invention relates to a cash memory device as described in any one of the first to third aspects of the invention wherein a plurality of the above described cash memories are prepared so as to correspond to their rank levels.

According to the present invention, it is arranged in such that even if a plurality of cash memories are disposed so as to correspond to their rank levels such as upper level and lower level, only the bits retained in an old way are inverted. Accordingly, it is sufficient for only one time access in case of updating bits, whereby a processing speed can be elevated in comparison with two times access in the prior art.

Other objects and features of this invention will become understood from the following description with reference to the accompanying drawings.

BRIEF DESCRIPTION OF THE DRAWINGS

The present invention will be explained in more detail in conjunction with appended drawings, wherein.

BRIEF DESCRIPTION OF THE PREFERRED EMBODIMENTS

In the following, the first and second embodiments of a cash memory device according to the present invention will be described in detail by referring to the accompanying drawings.

First Embodiment

Figure 1:
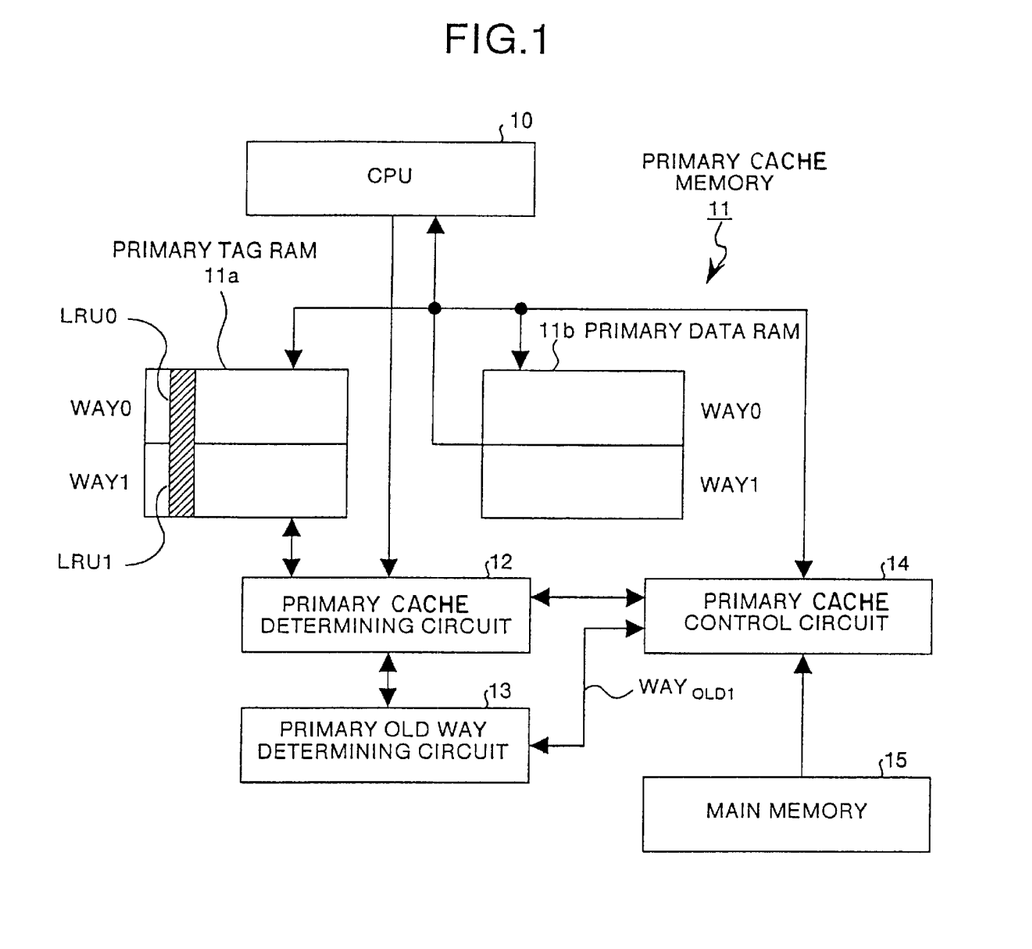
FIG. 1 is a block diagram illustrating a constitution of an first embodiment according to the present invention.

FIG. 1 is a block diagram illustrating a constitution of the first embodiment according to the present invention wherein a cash memory device shown in the same figure is provided with a primary cash memory 11 for eliminating differences in speed between a CPU (Central Processing Unit) and a main memory 15.

The CPU 10 reads data from the primary cash memory 11 or the main memory 15. The main memory 15 has characteristic features of a high capacity and a slower access time than that of the primary cash memory 11, and all the data used for the CPU 10 is stored therein. On one hand, the primary cash memory 11 is, for example, SRAM (Static Random Access Memory) and has characteristic features of a faster access time than that of the main memory 15 as well as of a smaller storage capacity than that of the main memory 15.

In general, data transmission between a CPU and a cash memory (main memory) is conducted in line unit, and there are some methods for assigning data on the main memory to a line in the cash memory. As a typical method, there is a set associative method wherein the main memory and the cash memory are divided into a plurality of sets (a set of lines: called by the name of "way"), and a certain data on the main memory shall be disposed on only a line contained in each way which has been previously specified.

In a set associative method, if the number of ways is N, the method is called by the name of N way set associative method. In the case where a cash memory is handled as one way, the method is called by the name of direct mapping method (or 1 way set associative method). In the cash memory device shown in FIG. 1, a 2 way set associative method containing two ways of a primary way WAY0 and a primary way WAY1 is adopted.

The primary cash memory 11 stores a part of the data stored in the main memory 15, and this is the one of 2 way set associative method. The primary cash memory 11 is composed of a primary tag RAM 11a retaining an address indicating a position at which data has been stored, and a primary data RAM 11b retaining the data.

These primary tag RAM 11a and primary data RAM 11b are divided into two primary ways WAY0 and WAY1, respectively, to be controlled. In this case, the primary way WAY0 (the primary way WAY1) of the primary tag RAM 11a corresponds to the primary way WAY0 (the primary way WAY1) of the primary data RAM 11b in one-to-one relation. For instance, an address retained in a unit (called by the name of "entry") constituting the primary way WAY0 in the primary tag RAM 11a corresponds to data retained in an entry of the primary way WAY0 in the primary data RAM 11b in one-to-one relation.

Furthermore, in the primary way WAY0 of the primary tag RAM 11a, a bit LRU0 used for determining the undermentioned primary old way is retained in accordance with LRU algorithm. The bit LRU0 takes either of values "0" and "1". As described above, a bit LRU1 used for determining the primary old way is retained in the primary way WAY1 of the primary tag RAM 11a in accordance with LRU algorithm, and the bit LRU1 takes either of values "0" and "1".

Figure 4:
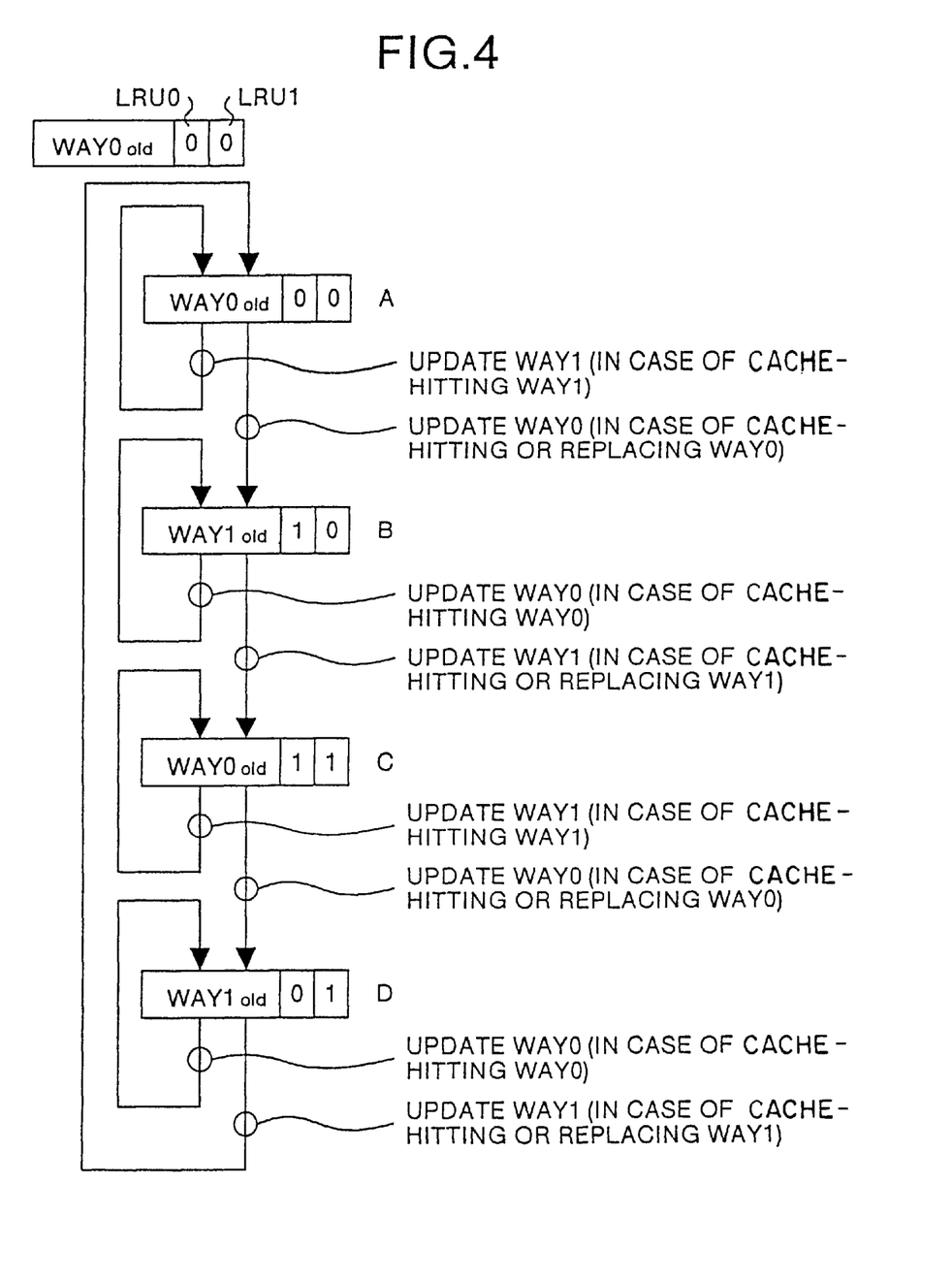
FIG. 4 is a diagram illustrating shift in between a bit LRU1 and a bit LRU0.

These bits LRU0 and LRU1 are of 2-bit composition, and they represent four types of status (way status A to way status D) of the primary way WAY0 and the primary way WAY1 as shown in FIG. 4. More specifically, the way status A represents that the primary way WAY0 is in a status of primary old way (represented by an expression "old" in FIG. 4), and it is expressed by "00" (the bit LRU0="0", the bit LRU1="0").

In the primary tag RAM 11a, a primary way (the primary way WAY0 or the primary way WAY1) which has not been accessed for the longest period of time is made to be the above described primary old way in accordance with LRU algorithm. In LRU algorithm, if replacement (updating) of an address and data is required, the address retained in the above described primary old way of the primary tag RAM 11a as well as of the data retained in the above described primary old way of the primary data RAM 11b are replaced.

The way status B shown in FIG. 4 means a status wherein the primary way WAY1 is in a primary old way ("old"), and it is expressed by "10" (bit LRU0="1", bit LRU1="0"). The way status C means a status wherein the primary way WAY0 is in a primary old way ("old"), and it is expressed by "11" (bit LRU0="1", bit LRU1="1". The way status D means a status wherein the primary way WAY1 is in a primary old way ("old"), and it is expressed by "01" (bit LRU0="0", bit LRU1="1").

The primary cash hit determining circuit 12 is a circuit which accesses to the primary tag RAM 11a in response to a reading demand from the CPU 10 under the control of the primary cash control circuit 14, compares an address of the data to be read with an address of the primary tag RAM 11a, and determines whether both the addresses do coincide with each other (This situation is called by the name of "primary cash hit") or not. In other words, the primary cash hit determining circuit 12 is the one for determining whether or not the data required by the CPU 10 exists in the primary data RAM 11b.

The primary old way determining circuit 13 is a circuit which replaces (updates) an address in an entry of a primary way (primary way WAY0 or primary way WAY1) in the primary tag RAM 11a, besides determines a primary old way to be replaced in the case when the data of a primary way (primary way WAY0 or primary way WAY1) in the primary data RAM 11b is replaced (updated). In other words, the primary old way determining circuit 13 is the one for determining which is a primary old way between the primary way WAY0 and the primary way WAY1.

Furthermore, a result of primary old way is expressed by a primary old way determination bit $WAY_{OLD1}$ in the primary old way determining circuit 13. When the primary old way determination bit $WAY_{OLD1}$ is "0", it means that the primary way WAY0 is a primary old way, while the primary old way determination bit $WAY_{OLD1}$ is "1", it means that the primary way WAY1 is a primary old way.

Figure 2A:
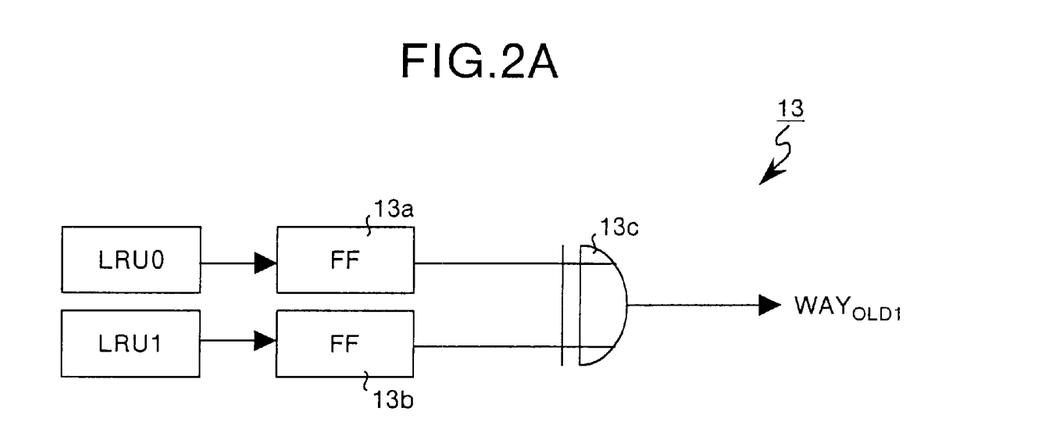
FIG. 2A is a block diagram illustrating a constitution of a primary old way determining circuit 13 shown in FIG. 1 or FIG. 6.
Figure 2B:
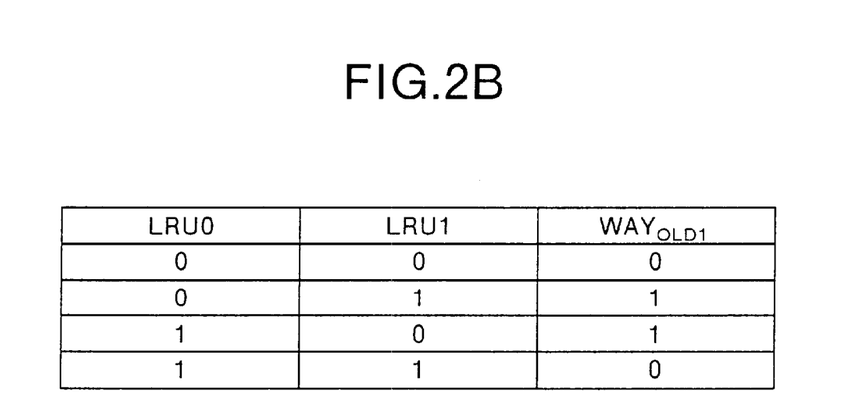
FIG. 2B is a table showing truth values in FIG. 2A.

FIG. 2A is a block diagram illustrating a constitution of the above described primary old way determining circuit 13, and FIG. 2B is a table of truth value as to the primary old way determining circuit 13. As shown in FIG. 2A, the primary old way determining circuit 13 is provided with an FF (flip-flop circuit) 13a retaining a bit LRU0 and an FF 13b retaining a bit LRU1 (see FIG. 1).

An output of the FF 13a (the bit LRU0) and an output of the FF 13b (the bit LRU1) are input to an exclusive OR circuit (equality circuit) 13c to output the primary old way determination bit $WAY_{OLD1}$ being its output (see FIG. 1) in accordance with the truth value table shown in FIG. 2B. A primary cash control circuit 14 implements control and the like for access to the primary cash memory 11, and details of operations in the primary cash control circuit 14 will be mentioned hereinafter.

Figure 3:
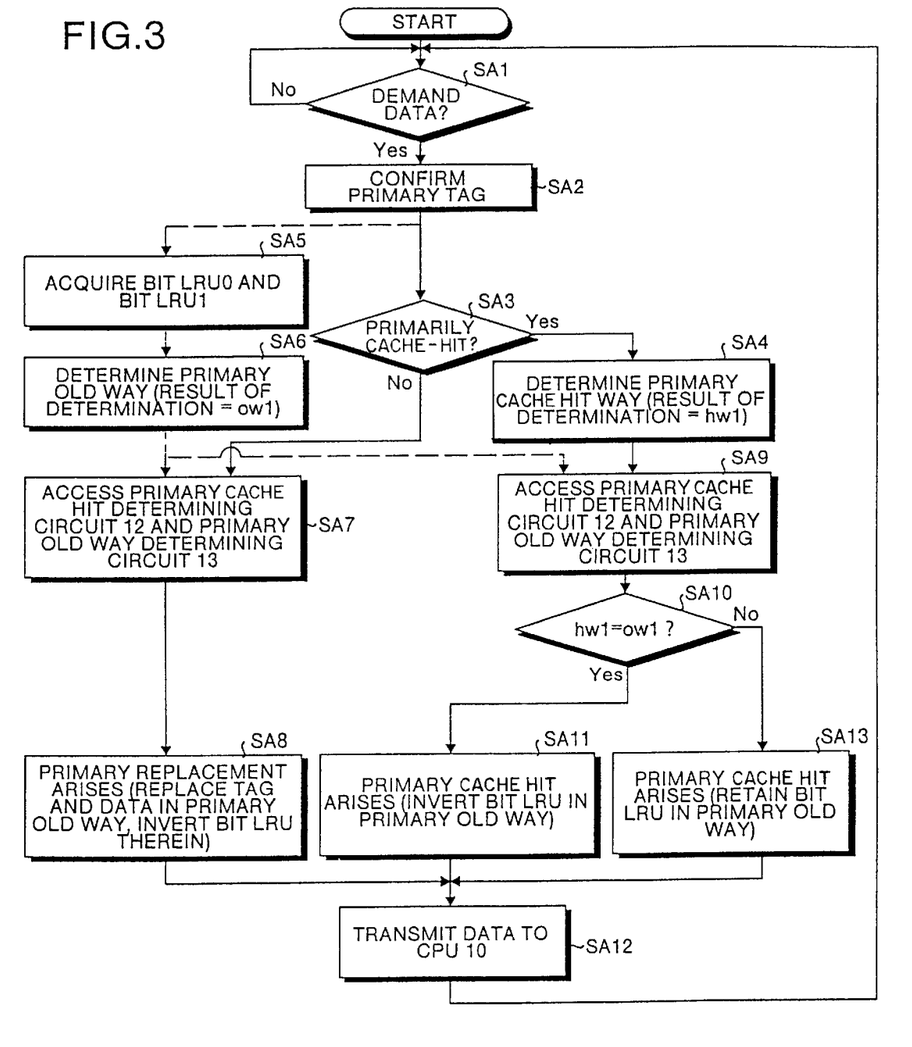
FIG. 3 is a flowchart for explaining operations of the first embodiment.

Next, operation of the first embodiment will be described by referring to the flowchart shown in FIG. 3 wherein the primary cash control circuit 14 determines whether or not there is a demand for data by the CPU 10 in a step SA1 of the same figure, and if a result of the determination is "No", the same determination is repeated. The demand for data means a demand to be read the data from the primary cash memory 11 (the primary data RAM 11b) or the main memory 15.

When a demand for data by which, for example, data in a predetermined address is to be read is sent out from the CPU 10, the primary cash control circuit 14 recognizes that a result of determination in the step SA1 is "Yes", and notifies the primary cash hit determining circuit 12 and the primary old way determining circuit 13 of the above described result of determination. As a result, the primary cash hit determining circuit 12 accesses to the primary tag RAM 11a, whereby the primary cash hit determining circuit 12 compares the above described address with that retained in the primary tag RAM 11a in a step SA2.

In a step SA3, the primary cash hit determining circuit 12 determines whether or not a questioned address exist in the primary tag RAM 11a, in other words, it determines whether or not there was a primary cash hit. In this case, when it is supposed that the questioned address does not exist in the primary tag RAM 11a, the primary cash hit determining circuit 12 is made a result of determination in the step SA3 as a primary cash miss to be "No". Namely, it means that data in the questioned address does not exist in the primary data RAM 11b, and the data is retained in the main memory 15.

On one hand, in a step SA5 in parallel with processing of the step SA3, the primary old way determining circuit 13 takes out a bit LRU0 and a bit LRU1 of the primary tag RAM 11a through the primary cash hit determining circuit 12. In this case, a primary way WAY0 and a primary way WAY1 in the primary tag RAM 11a are in the way status A (primary old way=primary way WAY0, "00") shown in FIG. 4, i.e., the bit LRU0 is "0", and the bit LRU1 is also "0".

In step SA6, the primary old way determining circuit 13 implements a primary old way determination on the basis of the bit LRU0 and the bit LRU1. In this case, since the bit LRU0="0" and the bit LRU1="0", a primary old way in the primary old way determining circuit 13 is a primary way WAY0 as is apparent from the truth value table shown in FIG. 2B. Accordingly, the primary old way determining circuit 13 makes the result of determination ow1 to be a primary old way determination bit $WAY_{OLD1}$="0" (primary old way=primary WAY0).

In a step SA7, the primary cash control circuit 14 accesses to the primary cash hit determining circuit 12 and the primary old way determining circuit 13, whereby a result of determination hw1 as to primary cash hit (a primary cash miss in this case) and a result of determination ow1 as to an old way (a primary old way determination bit $WAY_{OLD1}$= "0" in this case) are taken out.

As a result, a primary replacement arises with respect to a primary way WAY0 in a step SA8. More specifically, the primary cash control circuit 14 recognizes that replacement is necessary with respect to a primary old way in the primary cash memory 11 from the above described result of determination (cash miss) of primary cash hit as well as that the primary old way to be replaced is a primary way WAY0 from the primary old way determination bit $WAY_{OLD1}$ (="0") in the step SA8.

Then, the primary cash control circuit 14 reads the data in the questioned address from the main memory 15, and thereafter, it replaces a tag (address) and data with respect to the primary way WAY0 being a primary old way. Thus, an address of the primary way WAY0 (primary old way) in the primary tag RAM 11a is replaced by an address of the data read from the main memory 15, and at the same time, data of the primary way WAY0 (primary old way) in the primary data RAM 11b is replaced by data read from the main memory 15.

Moreover, the primary cash control circuit 14 inverts a bit LRU0 (="0") of a primary way WAY0 (primary old way) to (="1") in case of the above described replacement, whereby a status of the primary way shifts from the way status A to the way status B as shown in FIG. 4. More specifically, as a result of replacement of the primary way WAY0, the old way shifts from the primary way WAY0 to the way WAY1. In step SA12, the primary cash control circuit 14 transmits the data read from the main memory 15 to the CPU 10.

On the other hand, when a result of determination is "Yes" (="primary cash hit") in the step SA3, the primary cash hit determining circuit 12 conducts, in the step SA4, primary cash hit way determination for determining to the effect that primary cash hit was made in which primary ways of primary way WAY0 and primary way WAY1. In the specified case of FIG. 3, it is supposed that primary cash hit was effected in the primary way WAY0, so that the primary cash hit determining circuit 12 makes a result of determination hw1 to be a primary cash hit way=primary way WAY0.

In a step SA9, the primary cash control circuit 14 accesses to the primary cash hit determining circuit 12 and the primary old way determining circuit 13, whereby a result of determination hw1 as to a primary cash hit (primary way WAY0 in this case) and a result of determination ow1 as to a primary old way (primary way WAY0 in this case) are taken out.

In a step SA10, the primary cash control circuit 14 determines whether or not the result of determination hw1 (=the primary way WAY0) coincides with the result of determination ow1 (=the primary way WAY0), and in this specified case, a result of determination is "Yes". As a result, a primary cash hit with respect to the primary way WAY0 arises in a step SA11. Namely, the primary cash control circuit 14 accesses to the primary way WAY0 which was primarily cash-hit to read data from the primary way WAY0 in the primary data RAM 11b in the step SA11.

Moreover, the primary cash control circuit 14 inverts a bit LRU0 (="0") in the way WAY0 (primary old way) into (="1" ), whereby a status of the primary way WAY0 shifts from the way status A to the way status B as shown in FIG. 4. More specifically, it means that the primary old way shifts from the primary way WAY0 to the primary way WAY1 as a result of primary cash-hitting of the primary way WAY0. In a step SA12, the primary cash control circuit 14 transmits the data read from a primary way WAY0 in the primary data RAM 11b to the CPU 10.

Furthermore, in the case where a result of determination in the step SA3 is "Yes" (="primary cash hit"), and there was a primary cash hit in a primary way WAY1, the primary cash hit determining circuit 12 makes a result of determination hw1 to be a primary cash hit way=a primary way WAY1 in the step SA4.

In the step SA9, the primary cash control circuit 14 accesses to the primary cash hit determining circuit 12 and the primary old way determining circuit 13, whereby a result of determination hw1 as to a primary cash hit (primary way WAY1 in this case) and a result of determination ow1 as to a primary old way (primary way WAY0 in this case) are taken out.

In a step SA10, the primary cash control circuit 14 determines whether or not the result of determination hw1 (=the primary way WAY1) coincides with the result of determination ow1 (=the primary way WAY0), and in this specified case, a result of determination is "No". As a result, a primary cash hit with respect to the primary way WAY1 arises in a step SA13. Namely, the primary cash control circuit 14 accesses to the primary way WAY1 which was primarily cash-hit to read data from the primary way WAY1 in the primary data RAM 11b in the step SA13.

A bit LRU0 (="0") in the primary way WAY0 (primary old way) is retained without being inverted. Accordingly, a primary way status is maintained in the way status A as shown in FIG. 4. Namely, when the primary way WAY1 was primarily cash-hit in the way status A, the old way does not shift, so that it is the primary way WAY0. In a step SA12, the primary cash control circuit 14 transmits the data read from a primary way WAY1 of the primary data RAM 11b to the CPU 10.

At the time of primarily cash-hitting a primary way WAY0 in the way status B shown in FIG. 4, both of a bit LRU1 (="0") and the old way do not shift. On the other hand, at the time of either primarily cash-hitting or replacing a primary way WAY1 in the way status B, a bit LRU1 shifts from "0" to "1", and at the same time, an old way shifts from the primary way WAY1 to the primary way WAY0 (the way status C).

Furthermore, at the time of primarily cash-hitting a primary way WAY1 in the way status C shown in FIG. 4, both of a bit LRU0 (="1") and an old way do not shift, while the bit LRU0 shifts from "1" to "0", and at the same time, an old way shifts from the primary way WAY0 to the primary way WAY1 (the way status D) at the time of either primarily cash-hitting the primary way WAY0 or replacing the same in the way status C.

Moreover, at the time of primarily cash-hitting a primary way WAY0 in the way status D shown in FIG. 4, both of a bit LRU1 (="1") and an old way do not shift, while the bit LRU1 shifts from "1" to "0", and at the same time, an old way shifts from the primary way WAY1 to the primary way WAY0 (the way status A) at the time of either primarily cash-hitting the primary way WAY1 or replacing the same in the way status D.

As described above, according to the first embodiment, when an old way is accessed, it is adapted that only a bit retained in an old way is inverted in two bits of LRU0 and LRU1 retained in two of a primary way WAY0 and a primary way WAY1, respectively. Accordingly, only one access is sufficient for updating bits, so that a processing speed can be improved in comparison with conventional two times of access.

While in the above-mentioned first embodiment, an example for which LRU algorithm wherein a way retaining data which has not been accessed for the longest period of time is replaced is adopted has been described, FIFO (First-In-First-Out) algorithm may be adopted in place of the LRU algorithm. The FIFO algorithm is the one for subjecting a way retaining data for the longest period of time to replacement. A modification of the first embodiment wherein the FIFO algorithm has been adopted will be described hereinafter.

Figure 5:
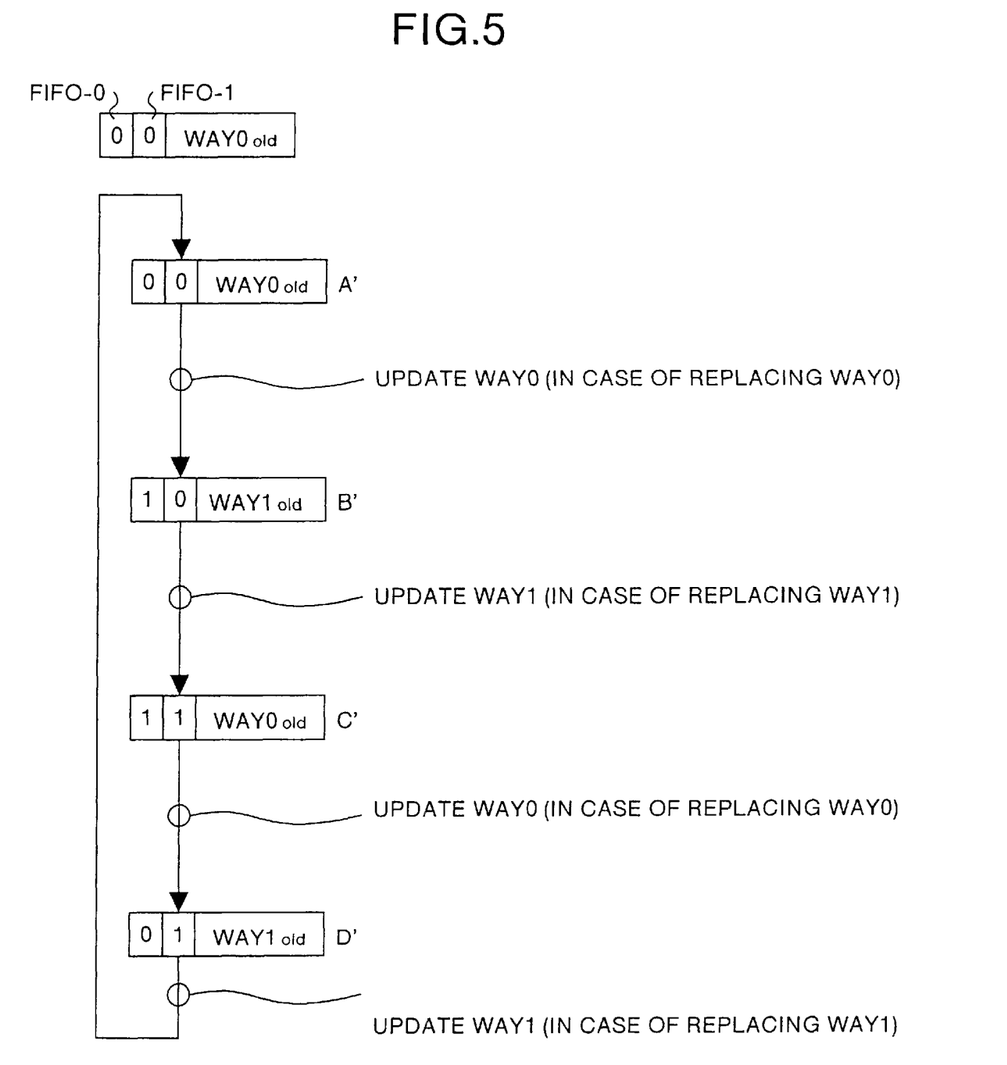
FIG. 5 is a diagram for explaining a modification of the first embodiment.

In this modification, a bit FIFO-0 and a bit FIFO-1 shown in FIG. 5 are retained in a primary way WAY0 and a primary way WAY1 in the primary tag RAM 11a shown in FIG. 1 in place of a bit LRU0 and a bit LRU1. These bits of FIFO-0 and FIFO-1 are used in the case where a primary old way is determined in accordance with FIFO algorithm. The term "old way" used herein means a way (a primary way WAY0 or a primary way WAY1) retaining data for the longest period of time.

These bits of FIFO-0 and FIFO-1 are of 2-bit composition, and as shown in the same figure, they express four types of status (a way status A' to a way status D' ) of a primary way WAY0 and a primary way WAY1. Namely, the way status A' means a status wherein the primary way WAY0 is in a primary old way (expressed by "old" in FIG. 5), and it is expressed by "00" (bit FIFO-0="0", and bit FIFO-1="0").

Further, the way status B' means a status wherein the primary way WAY1 is in a primary old way ("old"), and it is expressed by "10" (bit FIFO-0="1", and bit FIFO-1="0"). The way status C' is a status wherein the primary way WAY0 is in a primary old way ("old"), and it is expressed by "11" (bit FIFO-0="1", and bit FIFO-1="1"). The way status D' means a status wherein the primary way WAY1 is in a primary old way, and it is expressed by "01" (bit FIFO-0="0", and bit FIFO-1="1").

An essential operation of the present modification is the same as that of the above-mentioned first embodiment except that a bit FIFO-1 (or a bit FIFO-1) is not updated, even if there was a cash hit to a primary way WAY0 or a primary way WAY1. Namely, in the modification, the bit FIFO-0 (or the bit FIFO-1) is updated in only the case where the primary way WAY0 (or the primary way WAY1) was replaced.

In the way status A', when the primary way WAY0 being a primary old way is replaced, a bit FIFO-0 retained in the primary way WAY0 shifts from "0" to "1", and the primary old way shifts from the primary way WAY0 to the primary way WAY1 (the way status B'). Moreover, when the primary way WAY1 being a primary old way is replaced in the way status B', a bit FIFO-1 retained in the primary way WAY1 shifts from "0" to "1", and the primary old way shifts from the primary way WAY1 to the primary way WAY0 (the way status C').

Furthermore, when the primary way WAY0 being a primary old way is replaced in the way status C', a bit FIFO-0 retained in the primary way WAY0 shifts from "1" to "0", and the primary old way shifts from the primary way WAY0 to the primary way WAY1 (the way status D'). Further, when the primary way WAY1 being a primary old way is replaced in the way status D', a bit FIFO-0 retained in the primary way WAY1 shifts from "1" to "0", and the primary old way shifts from the primary way WAY1 to the primary way WAY0 (the way status A'). In addition, the bit FIFO-0 or the bit FIFO-1 is updated by the primary cash control circuit 14 (see FIG. 1).

As described above, according to the modification of the first embodiment, it has been arranged in such that only the bit FIFO-0 (or the bit FIFO-1) retained in an old way is inverted in the case when the old way was replaced. Accordingly, it is sufficient for only one time access in case of updating bits, so that a processing speed therefor can be improved as compared with a conventional two times of access.

Second Embodiment

Figure 6:
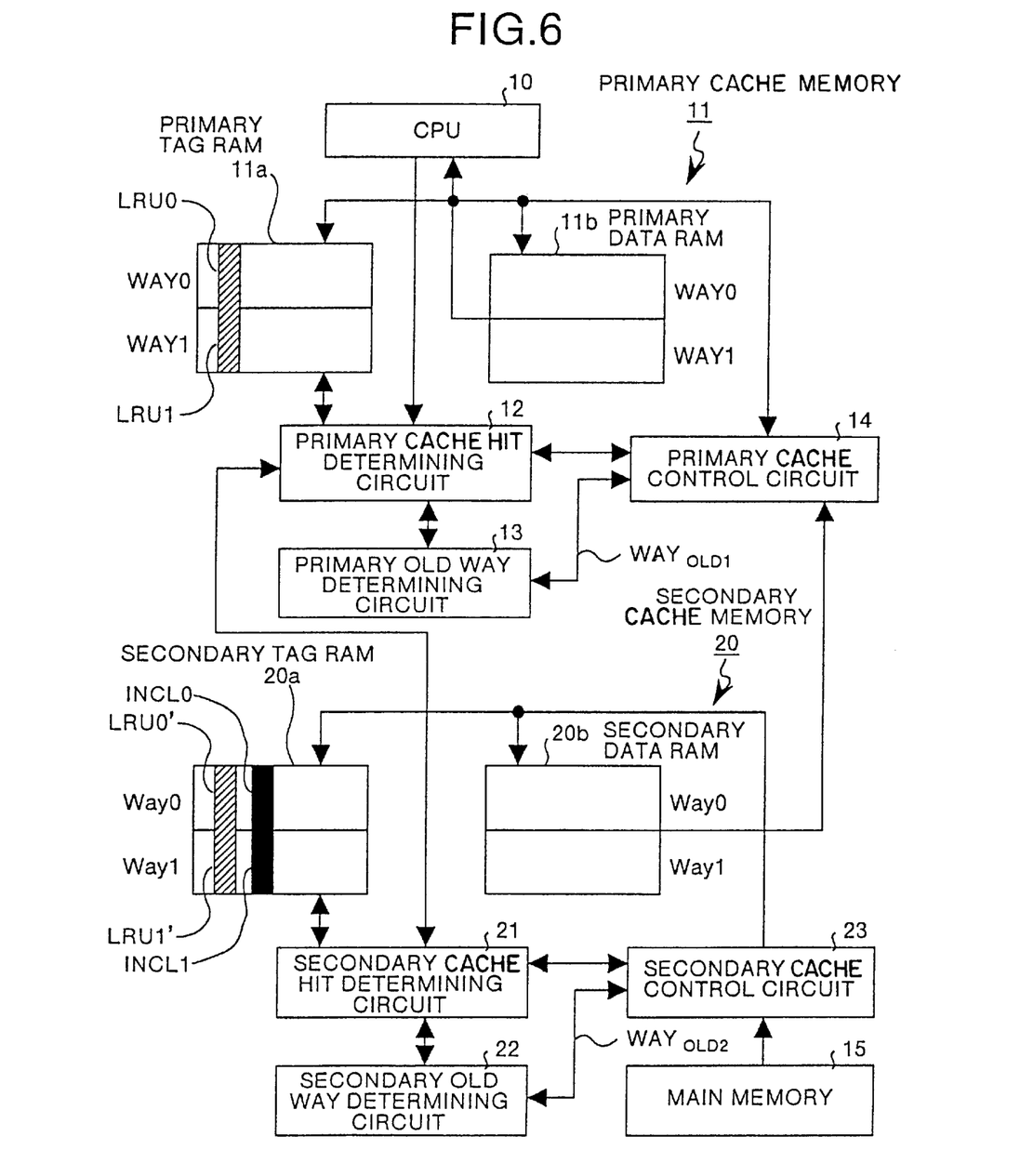
FIG. 6 is a block diagram illustrating a constitution of an second embodiment according to the present invention.

While an example wherein one primary cash memory 11 is used as a cash memory as shown in FIG. 1 has been described in the above-mentioned first embodiment, a primary cash memory 11 (superior cash memory) and a secondary cash memory 20 (subordinate cash memory) may be used as cash memories as shown in FIG. 6. In the following, the case described above will be explained as the second embodiment.

FIG. 6 is a block diagram showing a constitution of the second embodiment according to the present invention wherein components corresponding to those of FIG. 1 are designated by the same reference characters as those of FIG. 1, and the explanation therefor is omitted. The secondary cash memory 20 is, for example, SRAM which has such characteristic features that an access time is shorter than that of a main memory 15, and a storage capacity is smaller than that of the main memory 15.

The secondary cash memory 20 stores a part of data stored in the main memory 15, and is a memory of 2 way set associative method. The secondary cash memory 20 is composed of a secondary tag RAM 20a retaining an address indicating a memory position of data and a secondary data RAM 20b retaining the above described data.

These secondary tag RAM 20a and secondary data RAM 20b are adapted to be divided into two secondary way Way0 and secondary way Way1 to be administered, and a secondary way Way0 (secondary way Way1) of the secondary tag RAM 20a corresponds to a secondary way Way0 (secondary way Way1) of the secondary data RAM 20b in one-to-one relation. For instance, an address retained in an entry of the secondary way Way0 in the secondary tag RAM 20a corresponds to data retained in an entry of the secondary way Way0 in the secondary data RAM 20b in one-to-one relation.

Furthermore, a bit LRU0' used for determining a second old way which will be described hereinafter is retained in a secondary way Way0 of the secondary tag RAM 20a, and this bit LRU0' takes either value of "0" or "1". Likewise, a bit LRU1' used for determining a secondary old way is retained in a secondary way Way1 of the secondary tag RAM 20a, and the bit LRU1' takes either value of "0" or "1".

These bit LRU0' and bit LRU1' are of 2-bit composition, and express four types of status in respect of a secondary way Way0 and a secondary way Way1 as in the case of the first embodiment wherein a bit LRU0 and a bit LRU1 have been described by referring to FIG. 4.

In this situation, the secondary tag RAM 20a makes a secondary way (a secondary way Way0 or a secondary way Way1) which has not been accessed for the longest period of time to be a secondary old way in accordance with LRU algorithm as in the case of the primary tag RAM 11a. In the LRU algorithm, when replacement (update) of address and data is required, an address retained in the above described old way of the secondary tag RAM 20a and data retained in the above second old way of the secondary data RAM 20b are replaced.

In addition to the above, a bit INCL0 is retained in a secondary way Way0 in the secondary tag RAM 20a. The bit INCL0 is a bit indicating a fact whether or not the same data as that retained in a secondary way Way0 of the secondary data RAM 20b is also retained in a primary way Way0 of the primary data RAM 11b. Specifically, the bit INCL0 is represented by "1" in case of retention, while it is represented by "0" in case of no retention.

As in the above described case, a bit INCL1 is retained in a secondary way Way1 of the secondary tag RAM 20a. The bit INCL1 is a bit indicating a fact whether or not the same data as that retained in a secondary way Way1 of the secondary data RAM 20b is also retained in a primary way WAY1 of the primary data RAM 11b. Specifically, the bit INCL1 is represented by "1" in case of retention, while it is represented by "0" in case of no retention.

A secondary cash hit determining circuit 21 is a circuit for accessing to the secondary tag RAM 20a to compare an address of data to be read with an address of the secondary tag RAM 20a thereby to determine whether they coincide with each other (It is called by the name of "secondary cash hit".) or not under control of a secondary cash control circuit 23 in the case when there arose a cash miss in a primary cash memory 11 at the time of request for reading data from the CPU 10. In other words, the secondary cash hit determining circuit 21 is the one for determining whether or not data required by the CPU 10 does exist in the secondary data RAM 20b.

A secondary old way determining circuit 22 is a circuit for replacing (updating) an address in an entry of a secondary way (a secondary way Way0 or a secondary way Way1) in the secondary tag RAM 20a as well as for determining a secondary old way to be replaced in case of replacing (updating) data of a secondary way (a secondary way Way0 or a secondary way Way1) in the secondary data RAM 20b. More specifically, the secondary old way determining circuit 22 is the one for determining which is a second old way in a secondary way Way0 and a secondary way Way1.

Furthermore, the secondary old way determining circuit 22 makes a result of determination of a secondary old way to be a secondary old way determination bit $WAY_{OLD2}$. When the secondary old way determination bit $WAY_{OLD2}$ is "0", it means that a secondary way Way0 is a secondary old way, while when the secondary old way determination bit $WAY_{OLD2}$ is "1", it means that a secondary way Way1 is the secondary old way.

Figure 7A:
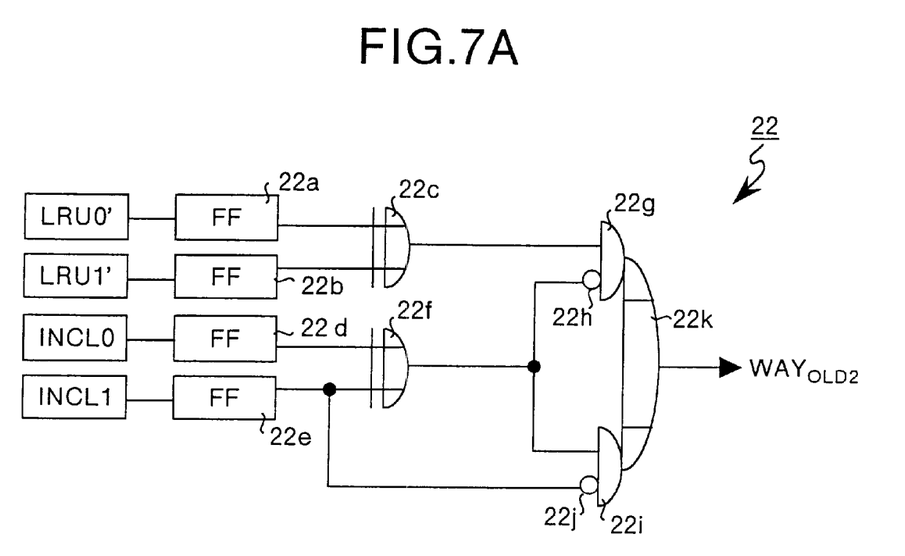
FIG. 7A is a block diagram illustrating a constitution of a secondary old way determining circuit 22 shown in FIG. 6.
Figure 7B:
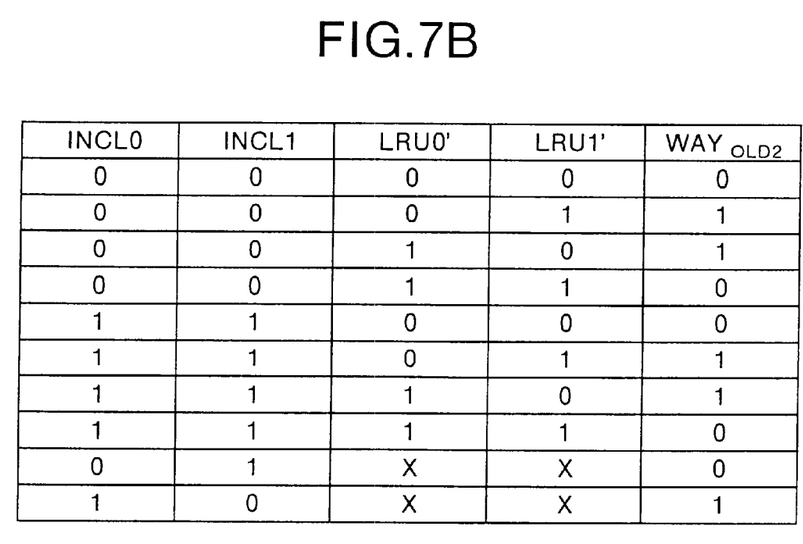
FIG. 7B is a table showing truth values in FIG. 7A.

FIG. 7A is a block diagram illustrating a constitution of the above described secondary old way determining circuit 22, and FIG. 7B is a truth value table of the secondary old way determining circuit 22. As shown in FIG. 7A, the secondary old way determining circuit 22 contains an FF 22a retaining a bit LRU0' and an FF 22b retaining a bit LRU1' (see FIG. 6) as well as an FF 22d retaining a bit INCL0 and an FF 22e retaining a bit INCL1 (see FIG. 6).

An exclusive OR circuit 22c is a circuit to which are input an output of the FF 22a (a bit LRU0') and an output of the FF 22b (a bit LRU1'). An exclusive OR circuit 22f is a circuit to which are input an output of the FF 22d (a bit INCL0) and an output of the FF 22e (a bit INCL1).

An AND circuit 22g is a circuit to which are input an output of the exclusive OR circuit 22c which was inverted by a NOT circuit 22h as well as an output of the exclusive OR circuit 22f which was inverted by the NOT circuit 22h. An AND circuit 22i is a circuit to which are input an output of the exclusive OR circuit 22f which was inverted by a NOT circuit 22j as well as an output of the FF 22e which was inverted by the NOT circuit 22j. An OR circuit 22k is a circuit to which are input an output of an AND circuit 22g as well as an output of an AND circuit 22i.

Moreover, the secondary old way determining circuit 22 outputs a secondary old way determination bit $WAY_{OLD2}$ (see FIG. 6) being an output in accordance with the truth value table shown in FIG. 7B. When the secondary old way determination bit $WAY_{OLD2}$ is "0", it means that the secondary old way is a secondary way Way0 (see FIG. 6), while when the secondary old way determination bit $WAY_{OLD2}$ is "1", it means that the secondary old way is a secondary way Way1 (see FIG. 6). The secondary cash control circuit 23 performs control and the like of access to the secondary cash memory 20. Details of operation in the secondary cash control circuit 23 will be mentioned hereinafter.

Figure 8:
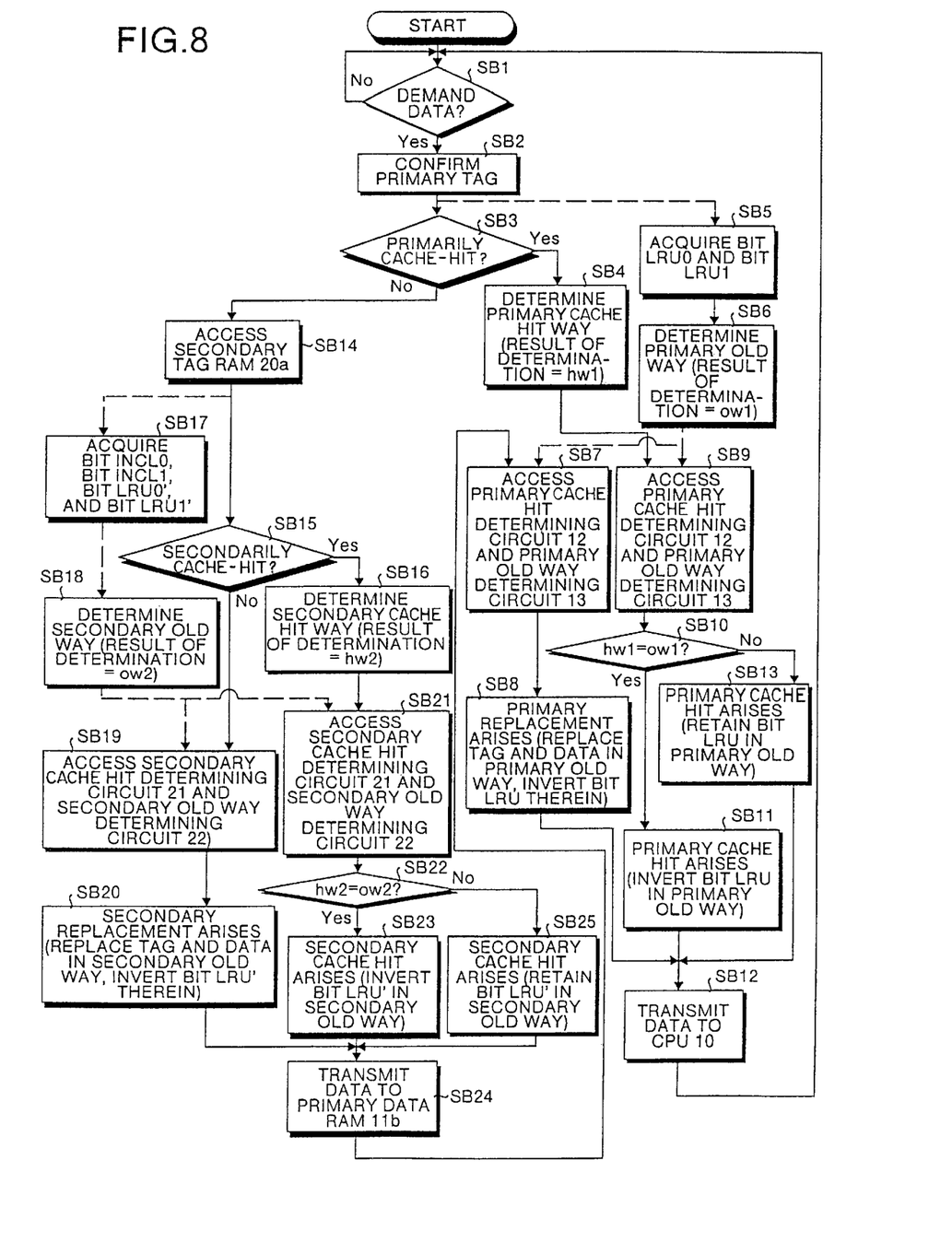
FIG. 8 is a flowchart for explaining operations of the second embodiment.

Next, operation of the second embodiment will be described by referring to the flowchart shown in FIG. 8 wherein steps SB1 to SB13 illustrated in FIG. 8 correspond to the steps SA1 to SA13 illustrated in FIG. 3, so that a detailed explanation of the steps SB1 to SB13 will be omitted.

When a data demand for demanding, for example, to be read data in a predetermined address is sent out from the CPU 10 shown in FIG. 6, a primary cash control 14 makes a result of determination in the step SB1 to be "Yes", and notifies a primary cash hit determining circuit 12 and a primary old way determining circuit 13 of this result of determination. Thus, the primary cash hit determining circuit 12 accesses to the primary tag RAM 11a, whereby the above described address is compared with an address retained in the primary tag RAM 11a as in the case of the first embodiment in the step SB2.

In the step SB3, the primary cash hit determining circuit 12 determines whether or not a questioned address exists in the primary tag RAM 11a, i.e., whether or not there was a primary cash hit. In this case, when it is supposed that the questioned address does not exist in the primary tag RAM 11a, the primary cash hit determining circuit 12 makes a result of determination in the step SB3 to be "No" as a primary cash miss. In other words, it means that no data in the questioned address exists in the primary data RAM 11b.

Hence, in a step SB14, the secondary cash hit determining circuit 21 accesses to the secondary tag RAM 20a, whereby it compares an address in question with an address retained in the secondary tag RAM 20a. In a step SB15, the secondary cash hit determining circuit 21 determines whether or not a questioned address exists in the secondary tag RAM 20a, i.e., whether or not there was a secondary cash hit. In this case, when it is supposed that the address in question does not exist in the secondary tag RAM 20a, the secondary cash hit determining circuit 21 makes a result of determination in the step SB15 to be "No" as a secondary cash miss. In other words, it means that data in the questioned address does not exist also in the secondary cash memory 20.

On one hand, in parallel to processing in the step SB15, a bit INCL0, a bit INCL1, a bit LRU0' and a bit LRU1' in the secondary tag RAM 20*a* are taken out by the secondary old way determining circuit 22 through the secondary cash hit determining circuit 21 in a step SB17.

In a step SB18, the secondary old way determining circuit 22 conducts secondary old way determination on the basis of a bit INCL0, a bit INCL1, a bit LRU0', and a bit LRU1' (see FIG. 7B). The secondary old way determining circuit 22 makes a result of determination ow2 to be a secondary old way determination bit WAY$_{OLD2}$. In this case, the secondary old way determination bit WAY$_{OLD2}$ is made to be "0". Namely, a secondary way Way0 is secondary old way in the secondary cash memory 20.

In a step SB19, the secondary cash control circuit 23 accesses to the secondary cash hit determining circuit 21 and the secondary old way determining circuit 22, whereby a result of determination hw2 relating to secondary cash hit (a secondary cash miss in this case) and a result of determination ow2 relating to an old way (a secondary old way determination bit WAY$_{OLD2}$=a secondary way Way0 in this case) are taken out.

As a result, a secondary replacement with respect to a secondary way Way0 arises in a step SB20. More specifically, in the step SB20, the secondary cash control circuit 23 recognizes that replacement is necessary for a secondary old way in the secondary cash memory 20 from a result of the above described secondary cash hit determination (cash miss), and at the same time, that the secondary old way to be replaced is a secondary way Way0 from the secondary old way determination bit WAY$_{OLD2}$ (="0").

Then, the secondary cash control circuit 23 reads data in an address in question from the main memory 15, and thereafter, replaces a tag (address) and data with respect to a secondary way Way0 being a secondary old way. Consequently, an address of a secondary way Way0 (a secondary old way) in the secondary tag RAM 20*a* is replaced by an address of the data read by the main memory 15, and at the same time, data of a secondary way Way0 (a secondary old way) in the secondary data RAM 20*b* is replaced by the data read by the main memory 15.

Furthermore, the secondary cash control circuit 23 inverts a bit LRU0' of a secondary way Way0 (a secondary old way) in case of the above described replacement. Namely, an old way shifts from the secondary way Way0 to the secondary way WAY1 as a result of the above replacement of the secondary way Way0. In a step SB24, the secondary cash control circuit 23 transmits data read from the main memory 15 to the primary cash memory 11 through the primary cash control circuit 14.

On one hand, when the result of determination in the step SB15 is "Yes" (="a secondary cash hit"), the secondary cash hit determining circuit 21 conducts secondary cash hit way determination wherein the secondary cash hit was made on the basis of which secondary way in a secondary way Way0 and a secondary way Way1 in a step SB16. In this specific case, it is supposed that the secondary cash hit was made based on the secondary way Way0. Accordingly, the secondary cash hit determining circuit 21 makes a result of determination hw2 to be the secondary cash hit way= secondary way Way0.

In a step SB21, the secondary cash control circuit 23 accesses to the secondary cash hit determining circuit 21 and the secondary old way determining circuit 22, whereby a result of determination hw2 relating to a secondary cash hit (a secondary way Way0 in this case) and a result of determination ow2 relating to a secondary old way (a secondary way Way0 in this case) are taken out.

In a step SB22, the secondary cash control circuit 23 determines whether or not the result of determination hw2 (=secondary way Way0) coincides with the result of determination ow2 (=secondary way Way0), and in this specific case, the result of determination is considered to be "Yes". As a result, a secondary cash hit arises with respect to a secondary way Way0 in a step SB23. More specifically, in the step SB23, the secondary cash control circuit 23 accesses to the secondary way Way0 which was secondarily cash-hit, and data is read from the secondary way Way0 in the secondary data RAM 20*b*.

Furthermore, the secondary cash control circuit 23 inverts a bit LRU0' (="0") of a secondary way Way0 (a secondary old way) to (="1"), whereby the secondary way Way0 is secondarily cash-hit, so that the secondary old way shifts from the secondary way Way0 to a secondary way Way1. In a step SB24, the secondary cash control circuit 23 transmits data read from a secondary way Way0 in the secondary data RAM 20*b* to the primary data RAM 11*b* through the primary cash control circuit 14.

Moreover, when the result of determination in the step SB15 is "Yes" (="secondary cash hit") and the secondary cash hit was made in a secondary way Way1, the secondary cash hit determining circuit 21 makes a result of determination hw2 to be a secondary cash hit way=a secondary way Way1 in the step SB16.

In the step SB21, the secondary cash control circuit 23 accesses to the secondary cash hit determining circuit 21 and the secondary old way determining circuit 22, whereby a result of determination hw2 as to a secondary cash hit (a secondary way Way1 in this case) and a result of determination ow2 as to an old way (a secondary way Way0 in this case) are taken out.

In the step SB22, the secondary cash control circuit 23 determines whether or not the result of determination hw2 (=secondary way Way1) coincides with the result of determination ow2 (=secondary way Way0), and in this case, the result of determination is considered to be "No". Thus, in the step SB25, a secondary cash hit arises with respect to the secondary way Way1. More specifically, in the step SB25, the secondary cash control circuit 23 accesses to the secondary way Way1 which was secondarily cash-hit, and reads data from a secondary way Way1 in the secondary data RAM 20*b*.

A bit LRU0' (="0") of a secondary way Way0 (a secondary old way) is not inverted, but retained. Namely, when a secondary way Way1 was secondarily cash-hit in the way status A, the old way does not shift, so that it is a secondary way Way0. In the step SB24, the secondary cash control circuit 23 makes a bit INCL1 to be "1", and then, transmits the data read from a secondary way Way1 in the secondary data RAM 20*b* to the primary data RAM 11*b*. To the second embodiment, FIFO algorithm as shown in FIG. 5 may be applied.

As is apparent for the above description, according to the second embodiment, even if the primary cash memory 11 and the secondary cash memory 20 are prepared in response to primary and secondary rank levels, it is adapted to invert only the bits retained in an old way. Accordingly, it is sufficient for only one time access in case of updating bits, so that a processing speed can be elevated in comparison with a conventional two times of access.

As described above, according to the invention as described in the first aspect of the invention, it is arranged in such that when an old way is accessed, only the bits retained in the old way in two bits which have been retained respectively in two ways are inverted. Accordingly, there is such an advantage that it is sufficient for only one time access in case of updating bits, whereby a processing speed can be elevated in comparison with two times access in the prior art.

Furthermore, according to the second aspect of the invention, it is arranged in such that when an old way is cash-hit or replaced, only the bits retained in the old way in two bits which have been retained respectively in two ways are inverted. Accordingly, there is such an advantage that it is sufficient for only one time access in case of updating bits, whereby a processing speed can be elevated in comparison with two times access in the prior art.

Moreover, according to the third aspect of the invention it is arranged in such that when an old way is replaced, only the bits retained in the old way are inverted. Accordingly, there is such an advantage that it is sufficient for only one time access in case of updating bits, whereby a processing speed can be elevated in comparison with two times access in the prior art.

Further, according to the forth aspect of the invention, it is arranged in such that even if a plurality of cash memories are disposed so as to correspond to their rank levels such as upper level and lower level, only the bits retained in an old way are inverted. Accordingly, there is such an advantage that it is sufficient for only one time access in case of updating bits, whereby a processing speed can be elevated in comparison with two times access in the prior art.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A cache memory device utilizing an algorithm wherein replacement is conducted with respect to an old way retaining data which has not been accessed for the longest period of time, comprising:
    a cache memory containing two ways each retaining bits taking a value 0 or 1 together with data and an address, respectively;
    an old way determining unit which determines which way of said two ways is said old way on the basis of patterns of two bits retained in said two ways; and
    a control unit which inverts only the bits retained in a way which has been accessed in said two ways in the case when the present way which has been accessed is said old way, while maintaining values of the bits retained in the present way in the case when the way which has been accessed is not said old way.

2. A cache memory device according to claim 1 wherein a plurality of said cache memories are prepared so as to correspond to their rank levels.

3. A cache memory device as claimed in claim 1 wherein when a way which has been cache-hit or replaced in said two ways is said old way, only the bits retained in the present way are inverted, while when said way which has been cache-hit or replaced is not said old way, values of the bits retained in the present way are maintained.

4. A cache memory device according to claim 3 wherein a plurality of said cache memories are prepared so as to correspond to their rank levels.

5. A cache memory device utilizing an algorithm wherein replacement is conducted with respect to an old way retaining data which has not been accessed for the longest period of time, comprising:
    a cache memory containing two ways each retaining bits taking a value 0 or 1 together with data and an address, respectively;
    an old way determining unit which determines which way of said two ways is said old way on the basis of patterns of two bits retained in said two ways; and
    a control unit which inverts only the bits retained in said way in the case when said replacement has been conducted.

6. A cache memory device according to claim 5 wherein a plurality of said cache memories are prepared so as to correspond to their rank levels.

* * * * *